United States Patent [19]
Boyer-Vidal

[11] Patent Number: 6,138,473
[45] Date of Patent: Oct. 31, 2000

[54] STATION AND PROCESS FOR DISPENSING A REDUCED-PRESSURE GAS

[75] Inventor: Aymeric Boyer-Vidal, Paris, France

[73] Assignee: L'Air Liquide, Societe Anonyme pour l'Etude et l'Exploitation des Procedes Georges Claude, Paris, Cedex, France

[21] Appl. No.: 09/260,493

[22] Filed: Mar. 2, 1999

[30] Foreign Application Priority Data

Mar. 2, 1998 [FR] France ................. 98 02 489

[51] Int. Cl.$^7$ ........................................ F25J 1/00
[52] U.S. Cl. .................. 62/613; 62/614; 62/616
[58] Field of Search .................. 62/606, 613, 617, 62/614, 615, 616

[56] References Cited

U.S. PATENT DOCUMENTS

| | | |
|---|---|---|
| 2,873,180 | 2/1959 | Gilbert . |
| 3,383,873 | 5/1968 | Becker ................... 62/613 |
| 3,608,323 | 9/1971 | Salama .................. 62/613 |
| 3,990,256 | 11/1976 | May et al. . |
| 5,799,505 | 9/1998 | Bonaquist et al. ......... 62/613 |
| 5,836,173 | 11/1998 | Lynch et al. ............. 62/613 |

FOREIGN PATENT DOCUMENTS

| | | |
|---|---|---|
| 0 733 849 | 9/1996 | European Pat. Off. . |
| 24 23 002 | 12/1974 | Germany . |
| 2 103 354 | 2/1983 | United Kingdom . |

Primary Examiner—William Doerrler
Attorney, Agent, or Firm—Young & Thompson

[57] ABSTRACT

A station for dispensing a gas, in particular nitrogen, under a dispensing pressure, includes a line (10) for gas inlet under an inlet high pressure, a line (14) for dispensing the gas under a lower dispensing pressure, and a device (16) for reducing the pressure of the gas to be dispensed from the inlet pressure to the dispensing pressure. The pressure-reducing device (16) includes a machine for pressure reduction with external work production. The station includes upstream of the pressure-reducing device (16), a conduit (18) for dividing the inlet gas into a fraction to be dispensed and a complementary fraction, downstream of the conduit (18), a device (20) for liquefaction of the complementary fraction of the inlet gas that includes a heat exchanger (26) for exchanging heat with the reduced-pressure fraction of the inlet gas, and a reservoir (40) for collecting the liquefied complementary fraction.

19 Claims, 1 Drawing Sheet

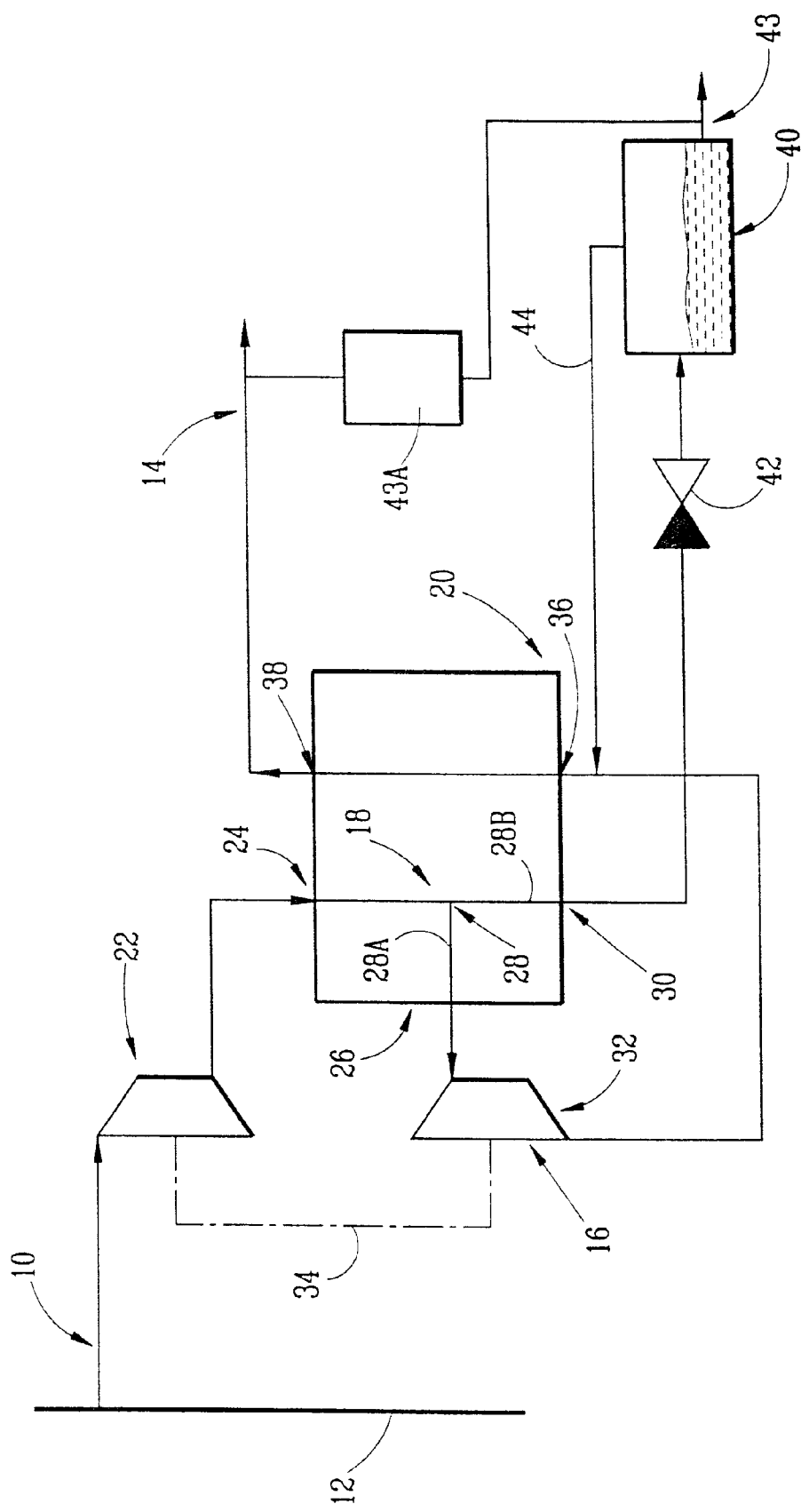

STATION AND PROCESS FOR DISPENSING A REDUCED-PRESSURE GAS

The present invention relates to a station for dispensing gas under a dispensing pressure, of the type including:
- a line for gas inlet under an inlet high pressure;
- a line for dispensing the gas under a dispensing pressure lower than the inlet high pressure; and
- means for reducing the pressure of the gas to be dispensed, from the inlet high pressure to the dispensing pressure.

Such dispensing stations are used at the various dispensing points in a communal network for supplying a gas, for example nitrogen.

The gas is transported under a high pressure, generally 40 bar in the case of nitrogen, through the lines of the communal distribution network.

Many users wish to obtain the gas, when it leaves the dispenser, under a dispensing pressure lower than the transport pressure corresponding to the pressure at which it is let into the dispensing station. This desired dispensing pressure, on leaving the dispensing station, is for example equal to 10 bar in the case of nitrogen.

In order to meet user requirements, the dispensing station therefore includes means for reducing the pressure of the gas from the inlet pressure (40 bar) to the dispensing pressure (10 bar).

These pressure-reducing means generally consist of a pressure-reducing valve and/or a pressure reducer. Such pressure reduction leads to a significant energy loss, since the pressure differential constitutes unutilized potential energy.

In GB-A-2 103 354, the gas at high pressure has its pressure reduced in a turbine, thus producing liquid. The reduced-pressure gas is recompressed and sent to the customer.

The object of the invention is to improve the energy efficiency of such dispensing stations by reducing the energy losses.

To this end, the invention relates to a gas dispensing station of the aforementioned type, characterized in that the said pressure-reducing means comprise a machine for pressure reduction with external work production, and in that the station includes:
- upstream of the pressure-reducing means, means for dividing the inlet gas into a fraction to be dispensed and a complementary fraction;
- downstream of the dividing means, means for at least partial liquefaction of the said complementary fraction of the inlet gas, comprising means for exchanging heat with the reduced-pressure fraction of the inlet gas; and
- means for collecting the liquefied complementary fraction.

According to particular embodiments, the dispensing station has one or more of the following characteristics:
- the said machine for pressure reduction with external work production includes a turbine;
- it includes a supercharger arranged upstream of the dividing means, which supercharger is coupled to the pressure-reducing machine for driving it;
- the said heat-exchange means include a countercurrent heat exchanger comprising:
  - cooling passages whose hot end is connected to the inlet line and whose cold end is connected to a reservoir for storing the liquefied complementary fraction;
  - warming passages whose cold end is connected to the output of the pressure-reducing machine and whose hot end is connected to the dispensing line; and
  - a tap connecting an intermediate point on the cooling passages to the inlet of the pressure-reducing machine;
- the liquefying means furthermore include a valve which is intended to reduce the pressure of the complementary fraction and is arranged downstream of the heat exchanger;
- it includes a line for returning an unliquefied part of the said complementary gas fraction, which line connects the upper part of the reservoir to the output of the pressure-reducing machine;
- the flow rate of the complementary fraction of the inlet gas is between 0.01 and 0.5 times the flow rate of the inlet gas;
- the gas is nitrogen and the flow rate of the complementary fraction of the inlet gas is between 0.05 and 0.19 times the flow rate of the inlet gas; and
- the said means for collecting the liquefied complementary fraction are connected via vaporizing means to the dispensing line.

The invention furthermore relates to a process for dispensing a gas under a dispensing pressure, including the following steps:
- inlet of the gas under an inlet high pressure;
- reduction of the pressure of the inlet gas, from the inlet high pressure to the lower dispensing pressure; and
- dispensing of the said fraction of the gas under the dispensing pressure; characterized in that it furthermore includes the following steps:
- drawing off a complementary fraction of the inlet gas, before the said pressure reduction;
- at least partial liquefaction of the complementary fraction, comprising exchange of heat with the reduced-pressure fraction of the inlet gas; and
- collecting the liquefied complementary fraction.

In one variant, an unliquefied gas fraction is warmed by exchange with the complementary fraction of the gas to be liquefied.

The high pressure may be supercritical, preferably less than 70 bar.

The invention will be understood more clearly on reading the following description which is given solely by way of example and with reference to the single figure, which is a diagram of the dispensing station according to the invention.

The dispensing station represented in the single figure includes, on the one hand, a gas inlet line 10, sectioning off from a communal network 12 for supplying under a transport or inlet pressure, and on the other hand a line 14 for dispensing a fraction of the inlet gas, under a dispensing pressure lower than the inlet pressure.

The dispensing station includes means 16 for reducing the pressure of the fraction of the gas to be dispensed to the dispensing pressure.

The station furthermore includes means 18 for dividing the inlet gas into a fraction to be dispensed and a complementary fraction. These means are arranged upstream of the pressure-reducing means 16. Means 20 for liquefying the complementary fraction of the inlet gas are arranged downstream of the pressure-reducing means 16 in the dispensing station.

More precisely, in the embodiment which is described, the line 10 is connected to the inlet of a supercharger 22 whose output is connected to the hot end 24 of the cooling passage of a countercurrent heat exchanger 26 forming an element of the liquefying means 20.

The dividing means 18 are arranged in the exchanger 26. In particular, a tap 28 is provided between the hot end 24 and the cold end, denoted 30, of the cooling passage of the exchanger. The tap 28 creates a branch. One of the sections, denoted 28A, carrying the fraction of the gas whose pressure is to be reduced leaves the exchanger 26 and feeds a machine 32 for pressure reduction with external work production, forming the pressure-reducing means 16. The other of the sections, denoted 28B, transporting the complementary fraction of the inlet gas continues through the exchanger as far as the cold end 30 of the cooling passage of the exchanger.

The machine for pressure reduction with external work production is formed, for example, by a turbine. The latter is coupled by a mechanical transmission system 34 to the supercharger 22 in order to drive the latter.

The output of the turbine 16 is connected to the cold end, denoted 36, of the warming passage of the exchanger 26. The hot end, denoted 38, of the warming passage is connected directly to the dispensing line 14.

The cold end 30 of the cooling passage of the exchanger is connected to a reservoir 40 for storing liquid nitrogen via a pressure-reducing valve 42. The reservoir is provided with an outlet 43 for dispensing liquid nitrogen. Furthermore, the outlet 43 is connected, via vaporizing means 43A to the line 14 in order after vaporization to supplement the dispensed gas flow in case of increased demand.

A branch 44 is provided between the upper part of the storage reservoir 40 and the cold end 36 of the warming passage of the exchanger, in order to divert the unliquefied part from the complementary fraction of the gas.

In one variant, not shown, the branch 44 passes through the exchanger 26 while being independent of the warming passage. Such is the case, in particular, if the output pressure of the turbine 32 is different from the pressure in the branch 44.

The dimensioning of the plant which has just been described corresponds to a nitrogen dispensing station designed to produce a flow rate of 10,000 m$^3$[stp]/h (cubic metres per hour at standard temperature and pressure) under a pressure of 10 bar nitrogen at ambient temperature.

In this example, the communal supply network 12 delivers nitrogen at the ambient temperature 20° C. under a pressure of 40 bar.

In order to provide a flow rate of 10,000 m$^3$[stp]/h in the dispensing line 14, the flow rate in the inlet line 10 is chosen to be higher than the flow rate desired by the user, so as to fill the reservoir 40 with liquefied nitrogen at the same time as nitrogen gas is dispensed under a pressure of 10 bar.

To this end, the flow rate at the inlet is set at 11249 m$^3$[stp]/h.

The supercharger 22 is dimensioned so as to increase the pressure of the nitrogen flow at its outlet. If the supercharger causes a significant rise in the temperature of the gas flow, cooling means (not shown) are arranged between the supercharger 22 and the hot end 24 of the cooling passage of the exchanger. These cooling means are, for example, an air exchanger.

Thus, at the hot end 24 of the cooling passage of the exchanger, the nitrogen has a supercritical pressure of 55 bar and a temperature of 20° C.

The tap 28 is positioned at an intermediate temperature of −105° C. and the temperature at the cold end 30 of the exchanger is −162° C.

The branch 18 is dimensioned so that the flow rate at the cold end 30 is 1374 m$^3$[stp]/h, while the flow rate sent to the turbine 32 is 9875 m$^3$[stp]/h.

Advantageously, the flow rate of the complementary fraction of the inlet gas which is intended to be liquefied is between 0.05 and 0.19 times the inlet gas flow rate.

At the cold end 30 of the cooling passage of the exchanger, the nitrogen is in a supercritical state, so that after passing through the pressure-reducing valve 42, 90 to 95% of the nitrogen is in the liquid phase at a temperature equal to −166° C. and under a pressure substantially equal to 11 bar. A flow rate of the oder of 1249 m$^3$[stp]/h is thus liquefied and accumulates in the reservoir 40.

At the outlet of the turbine 16, the nitrogen flows at a temperature of −165° C. under a pressure of 10 bar. The nitrogen is introduced at this temperature to the cold end 36 of the warming passage of the exchanger 26. At the hot end 38 of the warming passage, the nitrogen emerges at a temperature of the order of 18° C. under a pressure of 10 bar.

While travelling through the exchanger, the nitrogen is warmed from −165° C. to 18° C. by transferring the heat derived from the nitrogen, which has not had its pressure reduced, taken from the supercharger 22 and flowing between the hot end 24 and the cold end 30 of the cooling passage.

Furthermore, unliquefied residual nitrogen introduced into the reservoir 40 is returned by the branch 44 to the cold end 36 of the warming passage of the exchanger. The flow rate of nitrogen gas thus returned is substantially equal to 125 m$^3$[stp]/h.

It can thus be seen that the cold end 36 of the exchanger receives 10,000 m$^3$[stp]/h of nitrogen taken either directly from the turbine 16 with a flow rate of 9875 m$^3$[stp]/h or from the reservoir 40 at a flow rate of 125 m$^3$[stp]/h.

The supercharger 22 is optional. However, if it is present, the productivity of the distributing station is increased.

Without the supercharger, the turbine 16 is braked by any suitable device such as an electrical generator or an oil brake.

With such a dispensing station, the user has a point for dispensing nitrogen with the desired flow rate and under the desired pressure. He furthermore benefits, without extra energy supply, from a liquid nitrogen store in the reservoir 40, the liquid nitrogen being available at a temperature of −166° C. and under a pressure of 11 bar.

The productivity of such a dispensing station, regarding the production of liquefied gas, is very good compared with known liquefying plants.

Specifically, for a prior art liquefier employing a conventional liquefying cycle, the performance achieved for nitrogen is 0.55 kWh/m$^3$ (stp) in the best case.

With a dispensing station as described here, the specific energy for liquefaction, that is to say the energy needed to obtain a given volume of liquid, is 0.18 kWh/M$^3$ (stp).

This is equal to the average energy cost of injecting the liquefied quantity into the network 12.

The dispensing station therefore provides a productivity gain of the order of (0.55−0.18)/0.18=206%.

The dispensing station according to the invention, and the process employed, give the following advantages:

liquefaction of the gas with a very low specific energy;

making optimum use of the compression energy to produce liquid nitrogen;

delivering gas in liquid form without loss when charging or discharging;

delivering gas in liquid form with a low transport cost;

delivering gas in liquid form without transferring liquid between containers.

Such a dispensing station is suitable for other gases, in particular air, oxygen, natural gas, hydrogen, steam, carbon monoxide, carbon dioxide, or mixtures of these gases.

What is claimed is:

1. Station for dispensing a gas under a dispensing pressure, comprising:

a line (10) for gas inlet under an inlet high pressure;

a line (14) for dispensing the gas under a dispensing pressure lower than the inlet high pressure; and means (16) for reducing the pressure of the gas to be dispensed, from the inlet high pressure to the dispensing pressure, the said pressure-reducing means (16) comprising a machine (32) for pressure reduction with external work production, and wherein the station includes:

upstream of the pressure-reducing means (16), means (18) for dividing the inlet gas into a fraction to be dispensed and a complementary fraction;

downstream of the dividing means (18), means (20) for at least partial liquefaction of the said complementary fraction of the inlet gas, comprising means (26) for exchanging heat with the reduced-pressure fraction of the inlet gas; and means (40) for collecting the liquefied complementary fraction, wherein said heat-exchange means include a countercurrent heat exchanger (26) comprising, cooling passages whose hot end (24) is connected to the inlet line (10) and whose cold end (30) is connected to said means (40) for collecting the liquefied complementary fraction, warming passages whose cold end (36) is connected to the output of the pressure-reducing machine (32) and whose hot end (38) is connected to the dispensing line (14), and a tap (28) connecting an intermediate point on the cooling passages to the inlet of the pressure-reducing machine (32).

2. Dispensing station according to claim 1, wherein the said machine for pressure reduction with external work production includes a turbine (32).

3. Dispensing station according to claim 1, further comprising a supercharger (22) arranged upstream of the dividing means (18), which supercharger (22) is coupled to the pressure-reducing machine (16) for driving it.

4. Dispensing station according to claim 1, wherein the liquefying means (20) furthermore include a valve (42) which is intended to reduce the pressure of the complementary fraction and is arranged downstream of the heat exchanger (26).

5. Dispensing station according to claim 1, further comprising a line (44) for returning an unliquefied part of the said complementary gas fraction, which line (44) connects an upper part of the reservoir (40) to the output of the pressure-reducing machine (32).

6. Dispensing station according to claim 1, wherein a flow rate of the complementary fraction of the inlet gas is between 0.01 and 0.5 times a flow rate of the inlet gas.

7. Dispensing station according to claim 7, wherein the gas is nitrogen and the flow rate of the complementary fraction of the inlet gas is between 0.05 and 0.19 times the flow rate of the inlet gas.

8. Dispensing station according to claim 1, wherein said means (40) for collecting the liquefied complementary fraction are connected via vaporizing means (43A) to he dispensing line (14).

9. Process for dispensing a gas under a dispensing pressure, including the following steps:

inlet of the gas under an inlet high pressure;

reduction of the pressure of the inlet gas, from the inlet high pressure to a lower dispensing pressure; and dispensing of the a first fraction of the gas under the dispensing pressure;

drawing off a complementary fraction of the inlet gas, before the pressure reduction;

at least partial liquefaction of the complementary fraction, comprising exchange of heat with the reduced-pressure first fraction of the inlet gas, a first fraction of the gas being warmed by exchange with the complementary fraction of the gas to be liquefied; and collecting the liquefied complementary fraction.

10. A dispensing station for dispensing a gas at a dispensing pressure, comprising:

a gas inlet for receiving gas at an inlet pressure;

a gas dispenser for dispensing gas at a dispensing pressure lower than the inlet pressure;

a pressure reducing machine for reducing a pressure of gas from the inlet pressure to the dispensing pressure while producing external work;

a divider upstream of said pressure reducing machine for dividing gas from said gas inlet into a first fraction that is directed to an inlet of said pressure reducing machine and a complementary fraction;

a countercurrent heat exchanger downstream of said divider in which heat is passed from the complementary fraction to the pressure-reduced first fraction, at least partially liquefying the complementary fraction of gas and concurrently heating the pressure-reduced first fraction; and a reservoir collecting the at least partially liquified complementary fraction, said countercurrent heat exchanger comprising a cooling passage with a hot end in communication with said gas inlet and a cold end in communication with said reservoir, a warming passage with a cold end in communication with an output from said pressure reducing machine and a hot end from which the heated pressure-reduced first fraction of gas is sent to said gas dispenser to be dispensed at the dispensing pressure, said divider connecting said cooling passage to the inlet of said pressure reducing machine.

11. The dispensing station of claim 10, further comprising a supercharger connected between said gas inlet and said divider, said supercharger being coupled to and driven by said pressure reducing machine.

12. The dispensing station of claim 11, wherein said pressure reducing machine comprises a turbine.

13. The dispensing station of claim 10, further comprising a pressure reducing valve connected between the cold end of said cooling passage and said reservoir.

14. The dispensing station of claim 13, further comprising a gas line connecting an upper part of said reservoir to the output from said pressure reducing machine.

15. The dispensing station of claim 10, further comprising vaporizing means for supplementing gas dispensed from said gas dispenser, said vaporizing means being connected between said reservoir and said gas dispenser.

16. A method of dispensing gas at a dispensing pressure, comprising the steps of:

receiving gas at a gas inlet at an inlet pressure;

dividing gas from the gas inlet into a first fraction and a complementary fraction;

reducing a pressure of the first fraction of the gas from the inlet pressure to a dispensing pressure lower than the inlet pressure while producing external work;

dispensing the reduced-pressure first fraction of the gas at the dispensing pressure from a gas dispenser;

at least partially liquefying the complementary fraction of gas by passing heat to the reduced-pressure first fraction of gas in a countercurrent heat exchanger in which the reduced-pressure gas passes through a heating passage with a hot end from which the heated pressure-reduced first fraction of gas is sent to the gas dispenser to be dispensed at the dispensing pressure; and collecting the at least partially liquified complementary fraction from a cold end of a cooling passage in the countercurrent heat exchanger.

17. The method of claim 16, further comprising the step of driving a supercharger that is connected in a gas line for receiving gas from the gas inlet with the external work produced during the step of reducing the pressure of the first fraction.

18. The method of claim 16 further comprising the step of connecting an unliquefied portion of the at least partially liquified complementary fraction to the gas dispenser.

19. The method of claim 16, further comprising the step of supplementing gas dispensed from the gas dispenser by vaporizing a portion of the liquified complementary fraction.

* * * * *